United States Patent [19]

Staendeke et al.

[11] Patent Number: 4,853,424

[45] Date of Patent: Aug. 1, 1989

[54] FLAME-RETARDANT POLYMER COMPOSITIONS

[75] Inventors: Horst Staendeke, Lohmar, Fed. Rep. of Germany; Daniel Scharf, East Greenwich, R.I.

[73] Assignee: Hoechst Aktiengesellschaft, Frankfurt am Main, Fed. Rep. of Germany

[21] Appl. No.: 231,709

[22] Filed: Aug. 12, 1988

[30] Foreign Application Priority Data

Aug. 27, 1987 [DE] Fed. Rep. of Germany ....... 3728629

[51] Int. Cl.$^4$ .............................................. C08K 00/00
[52] U.S. Cl. .................................... 523/506; 523/205; 523/206; 523/210; 523/457; 523/452; 524/415; 524/416; 524/437
[58] Field of Search ............... 523/205, 206, 210, 457, 523/452, 506; 524/415, 416, 437

[56] References Cited

U.S. PATENT DOCUMENTS

| 4,136,080 | 1/1979 | Berger | 524/437 |
| 4,147,690 | 4/1979 | Rich | 524/437 |
| 4,193,908 | 3/1980 | Hsieh et al. | 523/513 |
| 4,312,805 | 1/1982 | Bertelli et al. | 524/416 |
| 4,347,334 | 8/1982 | Staendeke et al. | 524/416 |
| 4,421,876 | 12/1983 | Greber et al. | 524/437 |
| 4,467,056 | 8/1984 | Staendeke et al. | 524/416 |
| 4,514,328 | 4/1985 | Staendeke et al. | 428/921 |
| 4,639,331 | 1/1987 | Elsner et al. | 524/416 |
| 4,670,484 | 6/1987 | Fuchs et al. | 524/416 |
| 4,772,642 | 9/1988 | Staendeke | 524/416 |

FOREIGN PATENT DOCUMENTS 0178529 4/1986 European Pat. Off. .
54-22450 2/1979 Japan .

OTHER PUBLICATIONS

C. E. Miles, H. L. Vandersall and J. W. Lyons–"Phosphorus Requirements for Fire Retarding Natural and Synthetic Polymers"–ACS Div. Org. Coatings and Plastic Chemistry, Preprints, vol. 28, No. 1, (1968) pp. 237–242.

M. Tabana et al., Chem. Abs. 91:5950y (1979).

Primary Examiner—Veronica P. Hoke

[57] ABSTRACT

Flame-retardant polymer compositions containing a flame-retardant system consisting of a phosphorus/nitrogen-component and aluminum hydroxide.

11 Claims, No Drawings

FLAME-RETARDANT POLYMER COMPOSITIONS

This invention relates to flame-retardant polymer compositions, preferably duroplastic polymer compositions and more preferably to unsaturated polyester resins.

It is known that flame-retardant properties can be imparted to unsaturated polyester resins by admixing these resins either with an inorganic flame-retardant agent, such as aluminum hydroxide, or organic flame-retardant agent, such as a chloroparaffin or a halogenated biphenyl, or by chemically modifying the acid or alcohol component of the unsaturated monomer, commonly by halogenation. In the event of the unsaturated polyester being one containing halogen, the polyester is frequently admixed additionally with antimony trioxide acting as a synergist (cf. "Handbook of Plastics Flammability and Combustion Toxicology", Noyes Publications, Park Ridge, N.J., USA (1983)).

The term unsaturated polyester resin (UP-resins) is used herein to denote those products which are obtainable by means of a condensation reaction from saturated or unsaturated dicarboxylic acids most useful for this purpose are maleic acid, which is commonly used in the form of its anhydride, and fumaric acid. Propane diol-1,2 is the representative customarily selected from the diol series. Styrene which is miscible with a polyester resin in whatever ratio and is easy to copolymerize, is the reactive monomer most frequently used. Unsaturated polyester resins normally contain between 30 and 40 weight% of styrene (cf. Ullmanns Enzyklopädie der technischen Chemie, volume 19, pages 79–88, Verlag Chemie, Weinheim, (1980)).

Although aluminum hydroxide and ammonium polyphosphate tested separately have no effective flame-retardant activity for unsaturated polyesters, we have now unexpectedly found that the combination of ammonium polyphosphate with aluminum hydroxide is a highly effective flame-retardant system for unsaturated polyesters.

The present invention relates more particularly to a flame-retardant polymer composition which is characterized in that it contains a flame-retardant system consisting essentially of a phosphorus/nitrogen-component and aluminum hydroxide.

Further preferred and separate features typical of the flame-retardant polymer compositions of this invention provide:

(a) for the flame-retardant polymer composition to contain, as the phosphorus/nitrogen-component, 5–50 parts by weight of ammonium polyphosphate per 100 parts by weight of polymer;

(b) for the said ammonium polyphosphate to contain 0.5–25 weight % of a water-insoluble artificial, preferably cured, resin encapsulating the individual ammonium polyphosphate particles;

(c) for the said ammonium polyphosphate to contain 0.5–25 weight % of a reaction product of a polyisocyanate with a carbondiimidization catalyst, the polycarbodiimide formed encapsulating the individual ammonium polyphosphate particles;

(d) for the said ammonium polyphosphate to contain 0.5–25 weight% of a reaction product of a polyisocyanate and a polyhydroxy compound, the polyurethane formed encapsulating the individual ammonium polyphosphate particles;

(e) for the said ammonium polyphosphate to contain 0.5–25 weight% of a reaction product of a polyisocyanate with a trimerization catalyst, the polyisocyanurate formed encapsulating the individual ammonium polyphosphate particles;

(f) for the said ammonium polyphosphate to contain 0.5–25 weight% of a reaction product of a polyisocyanate and water, the polyurea formed encapsulating the individual ammonium polyphosphate particles;

(g) for the said ammonium polyphosphate to contain 0.5–25 weight% of a cured melamine/formaldehyde-resin, the melamine/formaldehyde resin encapsulating the individual ammonium polyphosphate particles;

(h) for the said ammonium polyphosphate to contain 0.5–25 weight% of a cured epoxide resin, the epoxide resin encapsulating the individual ammonium polyphosphate particles;

(i) for the said flame-retardant polymer composition to contain 50–175 parts by weight of aluminum hydroxide per 100 parts by weight of polymer;

(j) for the said flame-retardant polymer composition to contain the said ammonium polyphosphate and said aluminum hydroxide in a ratio by weight of 1:5 to 1:15;

(k) for the said flame-retardant polymer composition to be a duroplastic;

(l) for the said flame-retardant polymer composition to be an unsaturated polyester;

(m) for the said flame-retardant polymer composition to be reinforced by means of glass fibers.

The aluminum hydroxide should conveniently be used in the form of those products the production of which has been disclosed in European Patent EP-B2-0 011 667.

The ammonium polyphosphate which should preferably be used is a free-flowing, pulverulent, scarcely water-soluble ammonium polyphosphate of the formula $(NH_4PO_3)_3$, where n is a number between 20 and 1000, especially 500 and 1000; it should preferably be used in the form of particles of which more than 99% have a size of less than 45 μm.

The following Examples and Tables illustrate the invention in greater detail which however is naturally not limited thereto. The parts are by weight unless otherwise indicated.

EXAMPLE 1

1. Preparation of a blend of polyester/flame-retardant agent 100 parts ®ALPOLIT UP 002 (a registered Trade Mark of Hoechst Aktiengesellschaft, Frankfurt-/Main, Federal Republic of Germany) - it is a slightly viscous, highly reactive saturated polyester resin dissolved in styrene- 25 parts $^R$ EXOLIT 422 (a registered Trade Mark of Hoechst Aktiengesellschaft) - it is a fine particulate, scarcely water-soluble ammonium polyphosphate of the formula $(NH_4PO_3)_n$, where n is about 700; more than 99% of the ammonium polyphosphate particles have a size of less than 45 μm -

0.3 part cobalt accelerator NL 49 P (a product of Akzo Chemie GmbH, Düren, Federal Republic of Germany) - it is a cobalt octoate solution in dibutylphthalate containing 1 weight% cobalt were mixed in a suitable container using a dissolver disc. Next, 2.0 parts butanox M 50 (a product of Akzo Chemie GmbH, Düren) - it is methylethylketone peroxide desensitized with dimethyl phthalate, and available as a clear, colorless liquid containing at least 9 weight% active oxygen -and the whole is mixed once again.

2. Preparation of UP-resin laminates

Approximately 50% of the blend of polyester/-flame-retardant agent was regularly distributed on a parting film ($^R$ HOSTAPHAN RN 100/0.1 mm thick, a registered Trade Mark of Hoechst Aktiengesellschaft). Next, a matched, styrene-insoluble textile glass mat having a surface weight of 450 g/m² was placed thereon. By means of a lambskin roller, the second 50% portion of the blend of polyester/flame-retardant agent was regularly distributed on the glass mat and the occluded air was expelled. The laminate was then covered with a further parting film.

3. Preparation of test plate

The laminate was given into a warm water-heated BECKER-VAN HÜLLEN press and molded at a temperature of 50° C., under a pressure of 10 bars and over a period of about 1 hour into a test plate 1.6 mm thick 4. Flammability tests 4.1 The flammability of the composition was tested in accordance with the Underwriters Laboratories procedure "Test for Flammability of Plastic Material" - UL 94 dated as of May 2, 1975, on specimens 127 mm long, 12.7 mm wide and 1.6 mm thick.

4.2 The oxygen index was determined in a modified apparatus substantially in accordance with ASTM-D 2863-74

The results of the flammability tests are reported in Table 1.

EXAMPLES 2-25

The test plates were made and tested as described in Example 1. The data indicated in Tables 1-4, columns 2 and 3 relate to flame-retardant agents different in nature and concentration from those used in Example 1.

In addition to this, the following products were used in Examples 4-25.

®EXOLIT 462 (a registered Trade Mark of Hoechst Aktiengesellschaft) - it is a microencapsulated ammonium polyphosphate obtained by the process disclosed in EP-B-O 180 795, containing about 10 weight% encapsulating material consisting of a cured melamine/-formaldehyde resin.

®EXOLIT 455 (a registered Trade Mark of Hoechst Aktiengesellschaft) - it is a microencapsulated ammonium polyphosphate obtained by the process disclosed in EP-B-O 093 993 (=U.S. Pat. No. 4,514,328) containing about 10 weight% encapsulating material consisting of an epoxide resin.

®APYRAL 2 (a registered Trade Mark of VAW Vereinigte Aluminium Werke AG, Bonn, Federal Republic of Germany)

®APYRAL 3 (VAW, Bonn)

®APYRAL 4 (VAW, Bonn) - they are aluminum hydroxide grades, orginating from the BAYER-process and modified by the special process disclosed in EP-B-O 011 667.

As can be inferred from Table 1, the unsaturated polyester used in combination with ammonium polyphosphate within a concentration range of up to 75 parts/100 parts polyester resin, does not permit any classification whatsoever to be reached in the UL-94 vertical test. The same is true concerning the use of a luminum hydroxide within a concentration range of up to 175 parts/100 parts polyester resin.

In clear contrast with this, it is evident from Tables 2-4 that even minor quantities of ammonium polyphosphate also if microencapsulated in an artificial resin, used in combination with aluminum hydroxide unexpectedly permit the UL 94-classes V-1 and V-0 to be obtained.

TABLE 1

Flammability Test in Accordance with UL-94-vertical test[1]
Oxygen Index in Accordance with ASTM-D 2863-74

| Compar. Examples | Material | Flame-retardant System | | UL-94-vertical test | Oxygen Index |
|---|---|---|---|---|---|
| | | Quantity parts/100 parts UP[2] | Total quantity parts/100 parts UP[2] | | |
| 1 | EXOLIT 422 | 25 | 25 | n.c.[3] | 0.23 |
| 2 | EXOLIT 422 | 50 | 50 | n.c. | 0.25 |
| 3 | EXOLIT 422 | 75 | 75 | n.c. | 0.26 |
| 4 | APYRAL 4 | 125 | 125 | n.c. | 0.30 |
| 5 | APYRAL 4 | 150 | 150 | n.c. | 0.33 |
| 6 | APYRAL 4 | 175 | 175 | n.c. | 0.37 |
| 7 | APYRAL 2 | 150 | 150 | n.c. | 0.33 |
| 8 | APYRAL 3 | 150 | 150 | n.c. | 0.32 |
| 9 | EXOLIT 422 APYRAL 4 | 10 150 | 160 | V-1 | 0.34 |
| 10 | EXOLIT 422 APYRAL 4 | 15 150 | 165 | V-1 | 0.36 |
| 11 | EXOLIT 422 APYRAL 4 | 20 150 | 170 | V-0 | 0.38 |
| 12 | EXOLIT 422 APYRAL 4 | 25 150 | 175 | V-0 | 0.40 |
| 13 | EXOLIT 422 APYRAL 4 | 30 150 | 180 | V-0 | 0.41 |
| 14 | EXOLIT 422 APYRAL 2 | 15 150 | 165 | V-0 | 0.40 |
| 15 | EXOLIT 422 APYRAL 3 | 15 150 | 165 | V-0 | 0.41 |
| 16 | EXOLIT 462 APYRAL 4 | 10 150 | 160 | n.c.[3] | 0.35 |
| 17 | EXOLIT 462 APYRAL 4 | 15 150 | 165 | n.c. | 0.37 |
| 18 | EXOLIT 462 APYRAL 4 | 20 150 | 170 | V-0 | 0.38 |
| 19 | EXOLIT 462 | 25 | 175 | V-0 | 0.42 |

TABLE 1-continued

Flammability Test in Accordance with UL-94-vertical test[1]
Oxygen Index in Accordance with ASTM-D 2863-74

| Compar. Examples | Material | Flame-retardant System | | UL-94- vertical test | Oxygen Index |
|---|---|---|---|---|---|
| | | Quantity parts/100 parts UP[2] | Total quantity parts/100 parts UP[2] | | |
| 20 | APYRAL 4 | 150 | | | |
| | EXOLIT 462 | 30 | 180 | V-0 | 0.43 |
| 21 | APYRAL 4 | 150 | | | |
| | EXOLIT 455 | 10 | 160 | V-1 | 0.36 |
| 22 | APYRAL 4 | 150 | | | |
| | EXOLIT 455 | 15 | 165 | V-0 | 0.42 |
| 23 | APYRAL 4 | 150 | | | |
| | EXOLIT 455 | 20 | 170 | V-0 | 0.42 |
| 24 | APYRAL 4 | 150 | | | |
| | EXOLIT 455 | 25 | 175 | V-0 | 0.43 |
| 25 | APYRAL 4 | 150 | | | |
| | EXOLIT 455 | 30 | 180 | V-0 | 0.43 |

[1]Underwriters Laboratories "Test for Flammability of Plastic Material-UL 94" specimens: 127 mm long, 12.7 mm wide and 1.6 mm thick
[2]UP = ® ALPOLIT UP 002;
[3]n.c. = not classified as V-0, V-1, or V-2

We claim:

1. A flame-retardant polymer composition, wherein the polymer is an unsaturated polyester resin, containing a flame-retardant system consisting essentially of 5 to 50 parts by weight of ammonium polyphosphate and 50 to 175 parts by weight of aluminum hydroxide per 100 parts by weight of polymer the said ammonium polyphosphate containing 0.5 to 25 weight % of a water-insoluble synthetic resin encapsulating the individual ammonium polyphosphate particles.

2. A flame-retardant polymer composition as claimed in claim 1, wherein said unsaturated polyester resin is a duroplastic.

3. A flame-retardant polymer composition as claimed in claim 1, wherein the said ammonium polyphosphate contains 0.5 to 25 weight% of a reaction product of a polyisocyanate with a carbodiimidization catalyst, the polycarbodiimide formed encapsulating the individual ammonium polyphosphate particles.

4. A flame-retardant polymer composition as claimed in claim 1 wherein the said ammonium polyphosphate contains 0.5 to 25 weight% of a reaction product of a polyisocyanate and a polyhydroxy compound, the polyurethane formed encapsulating the individual ammonium polyphosphate particles.

5. A flame-retardant polymer composition as claimed in claim 1 wherein the said ammonium polyphosphate contains 0.5 to 25 weight% of a reaction product of a polyisocyanate with a trimerization catalyst, the polyisocyanurate formed encapsulating the individual ammonium polyphosphate particles.

6. A flame-retardant polymer composition as claimed in claim 1 wherein the said ammonium polyphosphate contains 0.5 to 25 weight% of a reaction product of a polyisocyanate and water, the polyurea formed encapsulating the individual ammonium polyphosphate particles.

7. A flame-retardant polymer composition as claimed in claim 1 wherein the said ammonium polyphosphate contains 0.5 to 25 weight% of a cured melamine/formaldehyde-resin, the melamine/formaldehyde resin encapsulating the individual ammonium polyphosphate particles.

8. A flame-retardant polymer composition as claimed in claim 1 wherein the said ammonium polyphosphate contains 0.5 to 25 weight% of a cured epoxide resin, the epoxide resin encapsulating the individual ammonium polyphosphate particles.

9. A flame-retardant polymer composition as claimed in claim 1 containing the said ammonium polyphosphate and said aluminum hydroxide in a ratio by weight of 1:5 to 1:15.

10. A flame-retardant polymer composition as claimed in claim 1 wherein said polymer is a polymer reinforced with glass fibers.

11. A flame-retardant polymer composition as claimed in claim 1 wherein the said water-insoluble synthetic resin is cured.

* * * * *